United States Patent
Hofmair et al.

(10) Patent No.: US 9,314,959 B2
(45) Date of Patent: Apr. 19, 2016

(54) VEHICLE INTERIOR COMPONENT WITH VACUUM-LAMINATED FOAM LAMINATE

(71) Applicant: Lisa Draexlmaier GmbH, Vilsbiburg (DE)

(72) Inventors: Stefan Hofmair, Moosburg (DE); Alois Mueller, Ergolding (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 611 days.

(21) Appl. No.: 13/678,829

(22) Filed: Nov. 16, 2012

(65) Prior Publication Data

US 2013/0118679 A1   May 16, 2013

(30) Foreign Application Priority Data

Nov. 16, 2011   (DE) .......... 10 2011 086 450

(51) Int. Cl.
*B29C 51/10* (2006.01)
*B60R 13/02* (2006.01)
*B29C 53/04* (2006.01)
*B29C 51/14* (2006.01)
*B60N 2/70* (2006.01)
*B32B 37/10* (2006.01)
*B32B 37/12* (2006.01)
*B32B 38/04* (2006.01)

(52) U.S. Cl.
CPC .......... *B29C 53/04* (2013.01); *B29C 51/10* (2013.01); *B29C 51/14* (2013.01); *B32B 37/1018* (2013.01); *B60N 2/7017* (2013.01); *B60R 13/02* (2013.01); *B32B 37/12* (2013.01); *B32B 2038/045* (2013.01); *B32B 2305/022* (2013.01); *B32B 2307/734* (2013.01); *B32B 2605/003* (2013.01)

(58) Field of Classification Search
CPC ........ B29C 51/12; B29C 51/10; B29C 51/14; B29C 51/145; B29C 51/266; B29C 51/265; B32B 37/1018; B60N 2/7017
See application file for complete search history.

(56) References Cited

U.S. PATENT DOCUMENTS

| | | | | |
|---|---|---|---|---|
| 5,297,842 | A | * | 3/1994 | Hayashi .................. B29C 51/12 156/260 |
| 5,695,865 | A | * | 12/1997 | Shimizu ........................ 428/212 |
| 6,685,789 | B1 | | 2/2004 | Wissing |
| 7,851,039 | B2 | * | 12/2010 | Boinais ................. B29C 44/351 428/102 |

(Continued)

FOREIGN PATENT DOCUMENTS

| | | |
|---|---|---|
| DE | 36 07 647 A1 | 9/1987 |
| DE | 41 05 261 A1 | 8/1992 |

(Continued)

OTHER PUBLICATIONS

English translation of Official Action mailed Apr. 9, 2013 for DE 10 2011 086 450.4 (3 pages).

*Primary Examiner* — William Bell
(74) *Attorney, Agent, or Firm* — Finnegan, Henderson, Farabow, Garrett & Dunner LLP

(57) ABSTRACT

A method of manufacturing an interior component for a vehicle interior. The method involves laminating, in a laminating mold, a foam laminate onto a dimensionally stable substrate with a three-dimensional surface contour. The method includes providing the substrate, applying the foam laminate onto the three-dimensional surface contour of the substrate by way of a vacuum, and bonding the substrate to the foam laminate.

9 Claims, 1 Drawing Sheet

(56) References Cited

U.S. PATENT DOCUMENTS

| | | | |
|---|---|---|---|
| 2007/0035071 A1* | 2/2007 | Smith et al. | 264/553 |
| 2007/0292807 A1* | 12/2007 | Campbell | 430/322 |
| 2008/0073807 A1* | 3/2008 | Cowelchuk | B29C 45/16 264/46.4 |
| 2010/0272955 A1 | 10/2010 | Chimelak et al. | |
| 2011/0198021 A1 | 8/2011 | Meyer et al. | |
| 2011/0215603 A1* | 9/2011 | Gutt | B29C 43/146 296/1.08 |
| 2012/0100342 A1* | 4/2012 | Schaefer | 428/156 |
| 2012/0261934 A1* | 10/2012 | Dyckerhoff | B29C 63/04 296/1.08 |

FOREIGN PATENT DOCUMENTS

| | | | |
|---|---|---|---|
| DE | WO 2006122919 A1 * | 11/2006 | B29C 43/146 |
| DE | 10 2008 009 762 A1 | 8/2009 | |
| EP | 0 500 202 B1 | 8/1995 | |
| WO | WO 96/16788 A1 | 6/1996 | |

\* cited by examiner

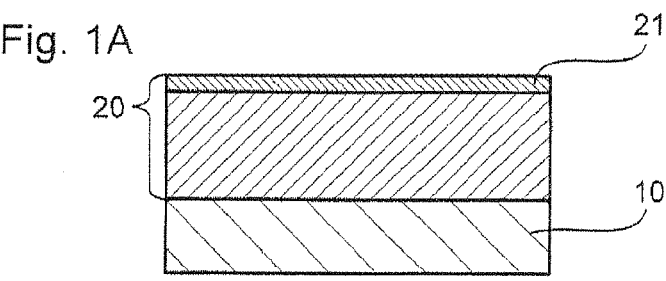
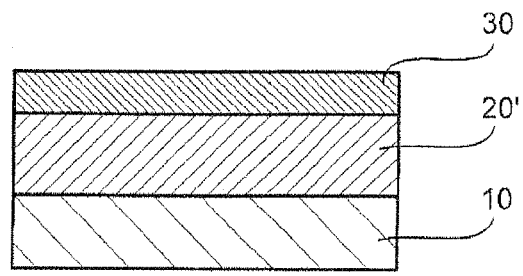
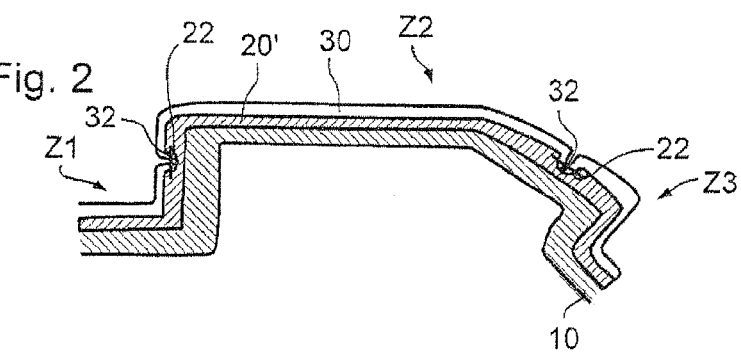

VEHICLE INTERIOR COMPONENT WITH VACUUM-LAMINATED FOAM LAMINATE

RELATED APPLICATIONS

Foreign priority benefits are claimed under 35 U.S.C. §119 (a)-(d) or 35 U.S.C. §365(b) of German application number 10 2011 086 450.4, filed Nov. 16, 2011, which is incorporated herein by reference in its entirety.

BACKGROUND

1. Field

Aspects relate to a method of producing a decorative component which is used in vehicle interiors. Aspects further relate to an interior component for a vehicle.

2. Discussion of Related Art

Various methods can be employed for the production of a substrate laminated with a flexible material layer. In the art, a distinction is made primarily between vacuum laminating (also termed film laminating) and press laminating.

In vacuum laminating, a flexible material layer, such as a plastic film, is typically laminated onto a substrate by the application of a vacuum. A vacuum laminating process uses a laminating mold in which the material layer is arranged at a specific distance above the substrate. The material layer is then applied onto the substrate by evacuating the mold. Textiles or open-pored foam materials are generally considered unsuitable for being laminable by the application of a vacuum due to their porous surface structure.

Press laminating is generally used for processing flexible material layers which may be unsuitable for vacuum laminating, such as open-pored foam materials and textiles, or for material layers which cannot be stretched or can only be stretched to a limited extent, such as leather or synthetic leather. For such materials, the substrate and the material layer, which are inserted in the mold, are pressed together or joined in a predefined pressing gap.

Compared to vacuum laminating, press laminating is generally a more expensive and more laborious method. In press laminating, the mold must be adapted for the particular thickness of the layers that are to be laminated. In contrast, vacuum laminating does not depend on the thickness of the material layers being laminated.

For upscale trim versions of vehicle interior components, which may include, for example, spacer fabrics as the haptic layer and leather or synthetic leather as the decorative layer, the composite of decorative and haptic layers is conventionally press laminated onto the substrate. If leather or leather-like materials are used as decor, the decor is typically in the form of a sewn covering which is bonded to a haptic layer specially adapted to the decor and the seams, which is then laminated onto the substrate. Therefore, for the upscale trim versions, the manufacture of an interior part is particularly laborious because it becomes necessary in each case to adapt intermediate layers, and even the substrate if necessary, to the decors of different trim versions. Additionally, the thicknesses of the various layers of the decorative part must be adapted to each other in each trim version in such a way that ensures the quality in their installed situation, particularly regarding compliance with gap measurements.

Against this background, an object of the present invention is to manufacture an interior component for a vehicle interior, particularly in upscale trim versions, more easily and inexpensively and with uniform quality.

SUMMARY

In one illustrative embodiment, a method is provided for manufacturing an interior component for a vehicle interior by laminating, in a laminating mold, a foam laminate onto a dimensionally stable substrate with a three-dimensional surface contour. The method comprises providing the substrate, applying the foam laminate onto the three-dimensional surface contour of the substrate by way of a vacuum, and bonding the substrate to the foam laminate to form a substrate composite.

In another illustrative embodiment, an interior component is provided for a vehicle interior. The interior component comprises a dimensionally stable substrate having a three-dimensional surface contour, and a foam laminate laminated onto the three-dimensional surface contour by way of a vacuum to form a substrate composite.

In a further embodiment, a method is provided for manufacturing an interior component for a vehicle interior. The method comprises vacuum laminating a foam laminate onto a dimensionally stable substrate with a three-dimensional surface contour to form a substrate composite and, after forming the substrate composite, press laminating a decorative layer to the substrate composite.

Further advantages and features of the present invention, which may be implemented singly or in combination with one or a plurality of the features referred to above emerge from the following description of preferred embodiments.

BRIEF DESCRIPTION OF DRAWINGS

Various embodiments of the invention will now be described, by way of example, with reference to the accompanying drawings, in which:

FIG. 1A is a cross-sectional illustration of a basic version of an interior component according to an embodiment of the present invention;

FIG. 1B is a cross-sectional illustration of a special trim version of an interior component having a decorative layer according to an embodiment of the present invention; and FIG. 2 is a cross-sectional illustration of a special trim version of an interior component having a sewn covering with a plurality of sewn panels and seams according to an embodiment of the present invention.

DETAILED DESCRIPTION

Aspects of the invention are based on the concept of manufacturing a base suitable for different trim versions by vacuum laminating a foam layer or foam laminate onto a three-dimensional surface contour of a substrate. The method enables at least partial standardization and simplification of the process for different trim versions. For example, different trim versions can be manufactured using the same mold due to the lack of dependence on the thickness of the foam layer during vacuum lamination. Omission of spacer fabrics typically used in the higher trim versions eliminates disadvantages associated with the haptic layer. For example, multiple injections of adhesive are used to fix a spacer fabric in position, during which the adhesive infiltrates the spacer fabric and hardens it. Moreover, manufacturing a common base with a substrate and foam layer can achieve a better gap and attachment situation due to smaller differences in the residual wall thicknesses of the basic and special trim versions.

The substrate may be manufactured using an injection molding process. Preferably, the substrate may include holes through which the laminating mold can be evacuated to establish a vacuum between the substrate and foam laminate. In one embodiment, the holes may be formed using a laser.

However, it is contemplated that any suitable process apparent to one of skill in the art may be employed to form holes in the substrate.

After bonding the substrate to the foam laminate, a decorative layer may be applied to the substrate and foam laminate composite using press lamination. When the decorative layer is comprised of leather, synthetic leather or a leather-like material, typical decorative substructures, such as, but not limited to, spacer fabrics, non-woven fabrics and block foam, can be omitted along with their laborious pre-processes, such as multiple injection of adhesive and pre-fixing.

Prior to vacuum laminating the foam laminate to the substrate, an adhesive may be applied to the three-dimensional contour of the substrate and/or onto the surface of the foam laminate that is to be bonded to the substrate so as to establish a firm bond between the foam layer and the substrate. In this manner, as compared to other haptic materials of upscale trim versions, a very durable bond is formed between the foam layer and the substrate. With other haptic materials, the adhesive may be absorbed and infiltrate deep into the material leading to an unnecessarily diminished adhesive area for the substrate. Such a disadvantage does not exist with a foam laminate, according to an embodiment of the invention, because the adhesive is retained over the entire surface of the foam laminate to thereby enable optimum adhesion to the substrate.

For a number of foam laminates, it may be possible to dispense with a sacrificial foil or special treatments of the foam laminate for rendering the foam laminates capable of vacuum lamination. For example, it may be possible to apply suction due to the impermeable surface of the foam laminate. In one embodiment, the foam structure itself forms an impermeable surface with a partially closed-pore foam laminate. If desired, a face layer may be provided on the foam laminate to allow for vacuum lamination.

For some applications, the face layer of the foam laminate may act as a decorative layer, particularly for basic versions of an interior component. In this manner, it may be possible to dispense with an additional process step of applying a separate decorative layer because the face layer of the foam laminate is vacuum laminated at the same time as the foam laminate is laminated to the substrate. The face layer may be grained, dyed or lacquered for a pleasing visual appearance in any suitable manner as should be apparent to one of skill in the art.

If desired, one or more seam grooves may be introduced into the foam layer during manufacture of the interior component. In this regard, the seam grooves may be introduced during or immediately after the laminating process. Introduction of the seam grooves in this manner shortens the process times accordingly. However, it is to be understood that introduction of the seam grooves may be postponed, if desired, to a later point in time.

In one embodiment, the seam grooves may be introduced in the laminating mold itself, resulting in further simplification of the process and further standardization of the methods for manufacturing interior components for different trim versions. The device for introducing the seam grooves may be integrated in the laminating mold or may be provided separately.

In one embodiment, the seam grooves may be introduced by way of thermal manipulation of the foam layer. During the process, the material of the foam layer may be fused and displaced at specific points. It is also contemplated to vaporize the material. Grooves or notches, which serve as seam grooves, may be formed in the foam layer as a result of the manipulation. Previously known processes for introducing the seam grooves, such as cutting and milling, may lead to material residues in the grooves and undesirable open surfaces which can encourage the foam layer to tear and allow foreign matter to enter. In contrast, thermal manipulation forms seam grooves with flat, closed surfaces which avoids the disadvantages of previously known processes and prevents undesirable accumulations of material and material scraps in the foam layer.

In one embodiment, a laser which fuses or vaporizes the material of the foam layer in specific areas using an energy input may be employed for the thermal manipulation. An advantage of introducing the seam grooves using a laser is chronological independence. In this regard, thermal manipulation using a laser may take place when the foam layer is either still in a heated state or when it has already cooled down. In addition to using a laser, it is also contemplated to use an air jet for introducing the seam grooves, wherein the foam layer is either present in a thermoplastic state during the manipulation or a hot air jet is used to introduce the seam grooves.

In one embodiment, a punch may be used for impressing the seam grooves in the foam layer. For example, a punch maybe designed as a part of the vacuum laminating mold, such as the upper mold half. The punch need not be permanently integrated but may also be movable, such as slidable, in relation to the laminating mold. Impressing the foam layer with the punch to form seam grooves may take place during vacuum lamination, or immediately thereafter, while the foam layer is in a warm, deformable state. In this manner, it is not necessary for the punch to be preheated resulting in the saving of additional energy for heating and reducing manufacturing time. However, it is to be understood that the punch may be heated, if desired. Heating the punch not only makes introduction of the seam grooves easier, but also allows for impressing the foam layer in the cooled state.

As should be appreciated, manufacturing interior components according to aspects of the invention are not only less expensive but may also provide, due to the mechanical production which is now possible, a higher processing quality because different trim versions start with one and the same base.

In one illustrative embodiment shown in FIG. 1A, an interior component may include a foam layer 20 situated on a dimensionally stable substrate 10. The foam layer may be in the form of a foam laminate comprising a polypropylene (PP) foam with a thickness of approximately 3 mm. It is to be appreciated that the foam layer may be formed of any suitable material to have any desired thickness as should be apparent to one of skill in the art.

To manufacture the interior component, a foam laminate 20 may be first unwound from a roll and conveyed, for example, by using a needle chain, into a laminating mold into which a dimensionally stable substrate 10 has already been introduced. The substrate 10 may be manufactured by injection molding, although other processes are contemplated as should be apparent to one of skill in the art.

The foam laminate 20 may be heated prior to or after being introduced into the laminating mold to convert the foam laminate into a thermoplastic state. The foam laminate 20 may be clamped on its edges, if necessary, and preformed as required. Preforming of the foam laminate 20 may take place either in or outside the laminating mold.

The preformed foam laminate 20 may be arranged at a distance above the surface of the substrate 10. The foam laminate may be sucked onto the substrate by way of a vacuum. The substrate may be provided with holes to facilitate mold evacuation for sucking in the foam laminate. The holes may be preformed in the substrate using a laser or other suitable process as should be apparent to one of skill in the art.

The foam laminate 20 may be provided with an impermeable area for facilitating suction. In one embodiment shown in FIG. 1A, a thin face layer 21 may be provided on the foam laminate 20. In one embodiment shown in FIG. 1B, the foam laminate 20' may be closed-pore and therefore necessarily has a closed area. In addition, the substrate 10 may have previously been provided with an adhesive on the relevant surface to establish a firm bond between the foam laminate 20 and the substrate 10.

As described above, an embodiment of a method is provided for manufacturing a base comprised of a substrate 10 and a foam layer 20, 20'. As should be appreciated, one or more trim versions of an interior component may be built using such a base.

In one embodiment, a basic version of an interior component may include a face layer 21 of foam laminate 20 that is arranged preferably on the visible side and is designed in such a way that it results in a pleasing visual appearance. For example, the face layer may be present as a colored lacquer or as a grained polyvinylchloride (PVC) layer. Therefore, no further process step is necessary for manufacturing the basic version of the interior component other than vacuum lamination of the foam laminate 20 onto the base.

In one embodiment for special trim versions of an interior component, a decorative layer 30 of synthetic leather or leather may be used for special trim versions, as shown in FIG. 1B. The decorative layer is subsequently laminated onto the base, for example, using a press laminating process.

The total thickness of the layered composite may be adapted easily by modifying the foam layer 20, 20'. Such a modification of the foam layer may achieve an approximately standardized thickness of the different trim versions.

In one embodiment for a basic version of an interior component, a foam laminate 20 with a face layer 21 has a thickness of 3.5 mm. In one embodiment for a special trim version of an interior component, a foam laminate 20' has a thickness of 2.5 mm and a decorative layer 30 has a thickness of 1.2 mm. It is to be appreciated that the foam layer and/or decorative layer may have any suitable thickness as should be apparent to one of skill in the art to achieve an approximately standardized thickness of the different trim versions.

For interior components that employ synthetic leather, leather or leather-like materials, it may be desirable to manufacture a sewn covering in which various pre-cut leather parts are sewn together prior to applying the leather layer to the layered composite. In one embodiment shown in FIG. 2, the decorative layer may be formed from pre-cut parts Z1, Z2, Z3 of material. The foam layer 20' has been vacuum laminated onto the substrate 10.

In one embodiment of a basic version comprised of a substrate 10 and a foam layer 20', one or more seam grooves 22 may be introduced directly into the foam layer 20' in the laminating mold or tool by use of thermal manipulation. A contour punch, which enables the impression of seam grooves 22 into foam layer 20', may be employed for the thermal manipulation. In one embodiment, the seam grooves may be impressed into the foam layer immediately after laminating the foam layer 20' while it is still in a heated, thermoplastic state.

As illustrated in FIG. 2, the seams 32' of the leather layer 30' are received and rest in the seam grooves 22. The seam grooves 22 preferably do not completely penetrate the foam layer. The depth of seam grooves 22 may be chosen in such a way to completely accommodate the sewn covering. Nevertheless, it is desirable for the foam layer 20' to remain stable and to ensure the haptic function. In one embodiment, the depth of the seam grooves 22 corresponds to approximately ⅔ of the thickness of the foam layer 20' for the customary trim parts.

Common use of a base for different trim versions may improve the gap and attachment situation due to smaller differences between the residual wall thicknesses of the basic and special trim versions and due to the standardized, mechanical manufacture of particularly high-quality trim versions which, for example, use a decorative layer of sewn leather. The method may be rendered less expensive by processing the foam laminate as roll goods. For further simplification of the method, the base and the trim versions may be processed in a mold since vacuum lamination is not dependent on the thickness of the foam layer.

What is claimed is:

1. A method of manufacturing an interior component for a vehicle interior by laminating, in a laminating mold, a foam laminate onto a dimensionally stable substrate with a three-dimensional surface contour, the method comprising:
   providing the substrate;
   applying the foam laminate onto the three-dimensional surface contour of the substrate by way of a vacuum;
   bonding the substrate to the foam laminate to form a substrate composite; and
   introducing one or more seam grooves into the foam laminate in the laminating mold by thermal manipulation of the foam laminate with a laser or a contour punch.

2. The method according to claim 1, further comprising subsequently applying a decorative layer to the substrate composite by way of press lamination.

3. The method according to claim 2, wherein the decorative layer is comprised of leather, synthetic leather or a leather-like material.

4. The method according to claim 1, further comprising, prior to applying the foam laminate to the substrate by way of a vacuum, applying an adhesive to the three-dimensional contour of the substrate and/or onto the surface of the foam laminate to be bonded to the substrate.

5. The method according to claim 1, wherein the foam laminate is untreated and is applied to the substrate by way of a vacuum without the use of an additional film for supporting the vacuum lamination.

6. A method of manufacturing an interior component for a vehicle interior, the method comprising:
   vacuum laminating a foam laminate onto a dimensionally stable substrate with a three-dimensional surface contour to form a substrate composite;
   introducing one or more seam grooves in the foam laminate, wherein the one or more seam grooves is introduced by thermal manipulation of the foam laminate with a laser or a contour punch; and
   after forming the substrate composite, press laminating a decorative layer to the substrate composite.

7. The method according to claim 6, wherein the decorative layer is comprised of leather, synthetic leather or a leather-like material.

8. The method according to claim 6, further comprising, prior to vacuum laminating the foam laminate to the substrate, applying an adhesive to the three-dimensional contour of the substrate and/or onto the surface of the foam laminate that is to be bonded to the substrate.

9. The method according to claim 6, wherein vacuum laminating of the foam laminate onto the substrate occurs without the use of an additional film for supporting the vacuum lamination.

* * * * *